United States Patent Office 2,890,708
Patented June 16, 1959

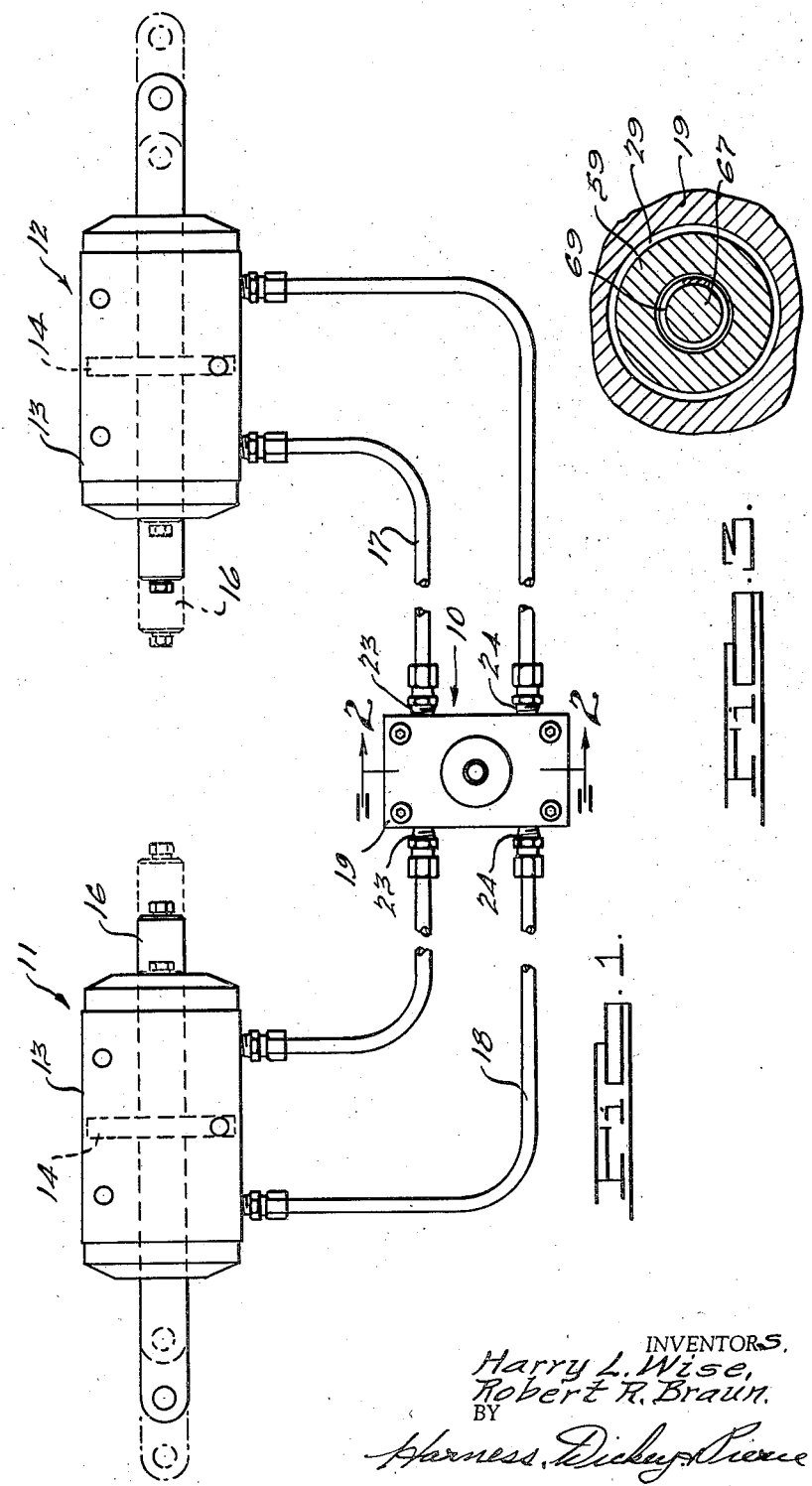

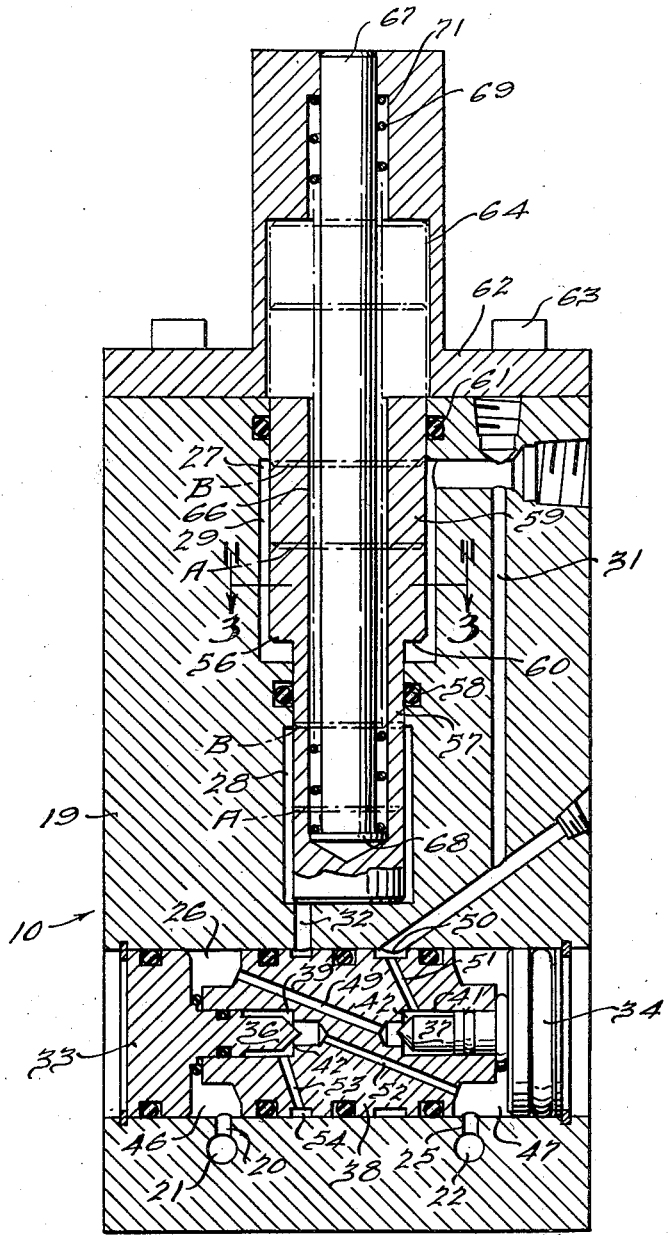

2,890,708

COMPENSATOR DEVICE

Harry L. Wise, Burnside, Ky., and Robert R. Braun, Miami, Fla.

Application January 7, 1957, Serial No. 632,928

11 Claims. (Cl. 137—87)

This invention relates generally to hydraulic systems and more particularly to a device for assembly in such systems to compensate for fluid volume changes in the system in response to temperature changes.

An object of this invention, therefore, is to provide an improved compensating device for fluid systems.

A further object of this invention is to provide a compensating device which is entirely fluid operated thereby dispensing with any mechanical locking devices and the delicate fits and mechanical part failures inherent in such devices.

Another object of this invention is to provide a compensating device which includes a fluid expansion chamber and a fluid operated seal for controlling the flow of fluid to and from the chamber with the tightness of the seal automatically increasing as the pressure differential in the system increases.

Still another object of this invention is to provide a compensating device of the above type which is simple and rugged in construction, economical to manufacture and efficient in operation over a prolonged service life.

Further objects, features and advantages of this invention will become apparent from a consideration of the following description when taken in connection with the accompanying drawing in which:

Fig. 1 is a plan view of a hydraulic system showing the compensating device of this invention in assembly relation therewith;

Fig. 2 is an enlarged sectional view looking along the line 2—2 in Fig. 1; and

Fig. 3 is a transverse sectional view looking along the line 3—3 in Fig. 2.

With reference to the drawing, the compensator device of this invention, indicated generally at 10, is illustrated in Fig. 1 installed in a closed hydraulic system which includes a pair of hydraulic piston and cylinder assemblies referred to hereinafter as a master assembly 11 and a slave assembly 12. In the normal operation of the system, the master assembly 11 is actuated to operate the slave 12 to perform work. Each of the assemblies 11 and 12 includes a cylinder 13 provided with a piston 14 having a piston rod 16 extended axially of the cylinder 13 and projected through opposite ends thereof. The cylinder 13 for the master 11 is connected on one side of the piston 14 to the cylinder 13 for the slave 12 on one side of the piston 14 by a fluid line 17. Similarly, the master cylinder 13 is connected on the other side of the master piston 14 by a line 18 to the slave cylinder 13 on the opposite side of the slave piston 14.

The compensator device 10 is connected across the lines 17 and 18 and includes a body member 19 provided with a pair of fluid passages 21 and 22 extended laterally therethrough. The passage 21 terminates at opposite sides of the body member 19 in a pair of fittings 23 connected in the line 17. Similarly the passage 22 terminates at opposite sides of the body member 19 in fittings 24 connected in the line 18.

A pair of passages 20 and 25 in the body member 19 connect the passages 21 and 22 with a valve chamber 26 formed in and extended transversely of the body member 19. Above the valve chamber 26, the body member 19 is formed with a longitudinally extended expansion chamber 27 formed in two portions, namely, a lower portion 28 and an upper portion 29, with the portion 29 being of a larger diameter than the portion 28. The valve chamber portion 29 is connected to the valve chamber 26 by a passage 31 in the body member 19 and the smaller expansion chamber portion 28 is similarly connected to the valve chamber 26 by a passage 32.

Mounted in spaced stationary positions within the chamber 26 are a pair of head members 33 and 34 which include cone-shaped valve portions 36 and 37 (respectively, extended toward each other. An elongated piston member 38, provided at opopsite ends with cavities 39 and 41 corresponding to the cone members 36 and 37, is slidably mounted in the chamber 26. Each cavity 39 and 41 is of a shape to provide a shoulder 42 which constitutes a valve seat adapted to be moved against the corresponding cone member 36 or 37 in a fluid tight relation therewith.

As best appears in Fig. 2, the piston 38, by virtue of its position between the head members 33 and 34, divides the valve chamber 26 into a pair of chamber portions 46 and 47 communicating, respectively, with the fluid passages 21 and 22. An inclined passage 49 in the piston 38 communicates the chamber portion 46 with the piston cavity 41 which is in turn communicated with the passage 31 by a second inclined passage 51 and an annular groove 50 extended about the piston 38. Similarly, the valve chamber portion 47 communicates with the piston cavity 39 through an inclined passage 52. The cavity 39 likewise communicates with the fluid passage 32 through an inclined passage 53 and an annular groove 54 formed in the piston 38.

A piston or plunger 56 positioned in the expansion chamber 27 has a reduced portion 57 positioned within the smaller chamber portion 28. A fluid sealing O-ring 58 mounted in the body member 19 engages an upper section of the piston portion 57 to seal the chamber portion 28 from the portion 29. The piston 56 also includes an upper enlarged portion 59 positioned within the chamber portion 29 and engaged at its upper end with an O-ring 61 which cooperates with the piston 56 to seal the upper end of the chamber 27. A plate 62 secured to the upper end of the body member 19 by bolts 63 has a cavity 64 positioned in axial alignment with the chamber 27 and of a size to accommodate the piston portion 59 on upward movement thereof.

The piston 56 is provided with an axial bore 66 which accommodates an elongated rod 67 formed on its lower end with an annular flange 68 engaged with the piston 56 at the lower end of the bore 66. A spring 69 in the bore 66 is positioned about the rod 67 and extends between the flange 68 and a shoulder 71 formed on the upper end of the plate 62. The spring 69 thus acts to exert a downward pressure on the piston 56 urging the piston toward the lower end of the valve chamber 27.

In the use of the compensator device 10 in the system illustrated in Fig. 1, the system is charged with fluid to raise the piston 56 to the position illustrated at A in Fig. 2. During such charging, the fluid from the lines 17 and 18 enters the valve chamber 26 through the passages 21 and 22 and travels from the chamber 26 through the inclined passages 49 and 52 in the piston 38 to the cavities 39 and 41. The piston 38 is of a size to provide for the provision of leak passages in the cavities 39 and 41 about the cone-valves 36 and 37 when the piston 38 is in a centered position relative to the cones. As a result, fluid readily travels from the chambers 39 and 41 to the expansion chamber 27. The piston 56 in the chamber 27 is of a predetermined configuration to provide for an area at the lower end of the piston portion 57 which is exactly equal to the annular area at the lower end 60 of the piston portion 59. When the system has been charged with fluid to an extent raising the piston 56 to the position indicated at A in Fig. 2 and all of the air has been displaced by fluid, the system is closed.

Since the spring 69 resists raising movement of the piston 56, it is apparent that when the piston 56 has been raised to the position indicated at A in Fig. 2, energy is stored in the spring 69 which exerts a pressure on the fluid in the system. When the master assembly 11 is idle, the pressure in the system is equal in the lines 17 and 18 so that the fluid pressure in the valve chamber portions 46 and 47 is likewise equal. As a result, the fluid pressure forces exerted on opposite ends of the piston 38 are equal and act to maintain the piston 38 in a centered position between the valve cones 36 and 37. As a result, during a rise in temperature the fluid in the system expands and travels equally from the chamber portions 46 and 47 to the expansion chamber portions 29 and 28, respectively, since the pressures on both sides of the piston 38 are equal. Conversely, during a drop in temperature and a consequent contraction of the fluid in the system, the effective fluid volume in the system is compensated by outward flow of fluid from the expansion chamber 27 as the energy stored in the spring 69 acts to move the piston downwardly. During normal use of the system the maximum rise of the piston 56 is indicated by the dotted line position B in Fig. 2.

Now assume that the master assembly 11 is actuated to move the piston 14 therefor toward the right as viewed in Fig. 1 to likewise move the slave piston 14 to the right so that the slave piston rod 16 accomplishes the desired work. Immediately upon actuation of the master assembly 11, the pressure in the line 17 starts to increase and the pressure in the line 18 starts to decrease. As a result, the pressure in the valve chamber portion 46 likewise starts to increase with a corresponding decrease in pressure in the chamber portion 47. Such pressure changes, however, do not affect the position of the expansion chamber piston 56 since the spring 69 is common to both of the expansion chamber portions 28 and 29. In other words, assuming that the nominal pressure exerted on the fluid in the expansion chamber 27 by the piston 56 is fifty pounds per square inch, the chamber portion 28 or 29 under increasing pressure can be increased to one hundred pounds per square inch while the other chamber portion 28 or 29 drops to zero before the piston 56 will change position.

During this period of pressure change transition, the pressures in the valve chamber portions 46 and 47 are no longer equal and in balance and the piston 38 is accordingly moved toward the right as viewed in Fig. 2 to a position in which the seat 42 is against the valve cone 37. Thus, as soon as the piston 38 is moved by the increased pressure in the chamber portion 46, communication of the chamber portion 46 with the expansion chamber portion 29 is closed by the seating of the valve cone 37 on the seat 42 in the cavity 41. As a result, the expansion chamber 27 is shut off from the high pressure line 17 and the greater the pressure in the line 17 the more tightly the seat 42 is forced against the valve cone 37. Accordingly, the expansion chamber 27 does not affect the normal operation of the system. It is apparent that when the master unit 11 is actuated in reverse direction, so that the pistons 14 are moved toward the left as viewed in Fig. 1, the operation is the same as above described except that the piston 38 moves in a reverse direction to discontinue the communication of the valve chamber portion 47, which is the high pressure portion under these circumstances, with the expansion chamber portion 28.

When the actuation of the master unit 11 is discontinued, the piston 38 will return to a centered position relative to the valve members 33 and 34 since the pressures in the valve chamber portions 46 and 47 return to a balanced condition. As a result, while the system is idle, the accumulator device 10 continues to act to compensate for any temperature changes of the fluid in the system.

Since the compensator device 10 is entirely fluid operated, it does not include any mechanical parts such as brakes or pins which are subject to breakage and must be precisely fitted. Accordingly, the device 10 is economically produced and efficiently operated over a prolonged service life.

Although the invention has been described with respect to a preferred embodiment thereof, it is to be understood that it is not to be so limited, since changes can be made therein which are within the scope of the invention as defined by the appended claims.

What is claimed is:

1. In a hydraulic remote control system which includes a master assembly and a slave assembly connected by a pair of fluid lines, a compensator unit adapted to be connected to said lines, said unit comprising a body member having a fluid expansion chamber therein having axially aligned portions, a first piston movable reciprocally in said chamber in fluid-tight engagement with one of said portions for preventing fluid communication of the portions, a second piston mounted in said body member for reciprocal movement between two stop positions, first passage means in said second piston and said body member communicating one of said lines with one portion of said expansion chamber, second passage means in said second piston and said body member communicating the other one of said lines with the other portion of said expansion chamber, said second piston being movable in response to differences in fluid pressure in said lines between a first limit position in which said first passage means is closed and a second limit position in which said second passage means is closed, said second piston being intermediate said limit positions when the pressures in said fluid lines are equal so that said fluid lines communicate with said expansion chamber.

2. For use in a hydraulic remote control system which includes a pair of master and slave assemblies and a pair of fluid lines extended therebetween, a compensator unit for compensating for changes in the volume of the fluids caused by expansion and contraction of the fluid in the system, said unit comprising a body member having an expansion chamber therein, passage means in said body member communicating with said chamber and adapted to communicate with said fluid lines, and valve means in said passage means movable between a first position opening said passage means for communicating said chamber with both of said fluid lines and a second position for communicating said chamber with only the one of said fluid lines having the lowest pressure therein when the pressure in said lines is different.

3. A compensator unit comprising a body member having first and second chambers therein, a pair of spaced valve members mounted in said first chamber, a piston movably mounted in said first chamber between said valve members, first fluid inlet means communicating with said first chamber on one side of said piston, second fluid inlet means communicating with said first chamber on the opposite side of said piston, and fluid passage means in said piston and said body member communicating both sides of said piston with said second chamber when the fluid pressure on said sides is equal, with said piston being movable to a position against one of said valve members in response to a difference in the fluid pressures on opposite sides of said piston to close a portion of said fluid passage means communicating said second chamber and that side of said piston having the higher fluid pressure.

4. A compensator unit comprising a body member having a fluid expansion chamber therein, a piston in said chamber, spring means in said chamber biasing the piston toward a position at one end of said chamber, a valve chamber in said body member communicating with said expansion chamber, a pair of valve members mounted in fixed spaced positions in said valve chamber, a piston movably mounted in said valve chamber between said valve members for movement in one direction to a stop position against one of said valve members and in an opposite direction to a stop position against the other one of said valve members, and fluid passage means in said piston arranged for cooperation with said valve members to close communication of said valve chamber on one side of said piston with said expansion chamber in each of said stop positions of said piston.

5. In a compensator unit adapted to be disposed in a fluid pressure system for compensating for volume changes of the fluid therein caused by expansion and contraction of the fluid in the system, and wherein said unit includes a body member having a valve chamber and an expansion chamber, a piston in said valve chamber having a pair of fluid passages formed therein for communicating the valve chamber at opposite ends of said piston with said expansion chamber, and valve members arranged in said valve chamber at opposite ends of said piston for coaction with said fluid passages to close one of said passages on movement of said piston in one direction and the other of said passages on movement of said piston in the other direction.

6. In a compensator unit adapted to be disposed in a fluid pressure system for compensating for volume changes of the fluid therein caused by expansion and contraction of the fluid in the system, and wherein said unit includes a body member having a valve chamber and an expansion chamber, a piston in said valve chamber having a pair of fluid passages formed therein for communicating the valve chamber at opposite ends of said piston with said expansion chamber, said piston being formed intermediate the ends of each fluid passage with a cavity of a shape to provide a seat, and valve members arranged in said valve chamber at opposite ends of said piston for coaction with said valve seats to close one of said passages on movement of said piston in one direction and the other of said passages on movement of said piston in the other direction.

7. In a hydraulic remote control system which includes a master assembly and a slave assembly connected by a pair of fluid lines, and wherein each of said assemblies includes a cylinder and a piston, a compensator unit adapted to be connected to said lines, said unit comprising a body member having a fluid expansion chamber therein, separate passage means in said body member corresponding to said fluid lines for communicating said chamber with said fluid lines and valve means in said passage means closable in response to a difference in pressure in said fluid lines for closing the passage means corresponding to the one of said fluid lines having the higher pressure.

8. A compensator unit comprising a body member having a fluid expansion chamber therein, a piston in said chamber, spring means in said chamber biasing the piston toward a position at the lower end of said chamber, a valve chamber in said body member communicating with the lower end of said expansion chamber, a pair of valve members mounted in fixed spaced positions in said valve chamber, a piston movably mounted in said valve chamber between said valve members for movement in one direction to a stop position against one of said valve members and in an opposite direction to a stop position against the other one of said valve members, fluid passage means in said piston communicating the portions of said valve chamber at opposite sides of said piston with said expansion chamber, said fluid passage means in said piston being arranged for cooperation with said valve members to close communication of said valve chamber on each side of said piston with said expansion chamber in each of said stop positions of said piston.

9. In a compensator unit adapted to be disposed in a fluid pressure system for compensating for volume changes of the fluid therein caused by expansion and contraction of the fluid in the system, and wherein said unit includes a body member having a valve chamber and an expansion chamber, a plunger in said expansion chamber, said expansion chamber and said plunger being of cooperating shapes dividing said expansion chamber into non-communicating lower and upper parts, a piston in said valve chamber having a pair of fluid passages formed therein for communicating the valve chamber at each end of said piston with one of said expansion chamber parts, and valve members arranged in said valve chamber at opposite ends of said piston for coaction with said fluid passages to close one of said passages on movement of said piston in one direction and the other of said passages on movement of said piston in the other direction.

10. A compensator unit comprising a body member having an upright fluid expansion chamber of a shape having coaxial small and large portions therein, a piston having corresponding small and large portions mounted in said chamber, spring means biasing the piston toward a position for displacing fluid from said chamber, a valve chamber in said body member, a pair of valve members mounted in fixed spaced positions in said valve chamber, a piston movably mounted in said valve chamber between said valve members for dividing said chamber into two portions and for movement in one direction to a stop position against one of said valve members and in an opposite direction to a stop position against the other one of said valve members, and fluid passage means in said piston communicating each valve chamber portion with one of said expansion chamber portions, said passage means being arranged for cooperation with said valve members to close communication of said valve chamber on one side of said piston with said expansion chamber in each of said stop positions of said piston.

11. A compensator unit comprising a body member having first and second chambers therein, a pair of spaced valve members mounted in said first chamber, a piston movably mounted in said first chamber between said valve members, first fluid inlet means communicating with said first chamber on one side of said piston, second fluid inlet means communicating with said first chamber on the opposite side of said piston, plunger means in said second chamber providing for a variable fluid volume in said second chamber, and fluid passage means in said piston and said body member separately communicating both sides of said piston with said second chamber in response to an equal fluid pressure on said sides, with said piston being movable to a position against one of said valve members in response to a difference in the fluid pressures on opposite sides of said piston to close a portion of said fluid passage means communicating said second chamber and that side of said piston having the higher fluid pressure.

References Cited in the file of this patent
UNITED STATES PATENTS

| | | |
|---|---|---|
| 2,383,180 | Ellinwood | Aug. 21, 1945 |
| 2,551,274 | MacDuff | May 1, 1951 |
| 2,705,969 | Ballard | Apr. 12, 1955 |